United States Patent
Nagashima et al.

(10) Patent No.: US 9,728,338 B2
(45) Date of Patent: Aug. 8, 2017

(54) METHOD FOR MANUFACTURING SOLID ELECTROLYTIC CAPACITOR

(71) Applicant: Panasonic Intellectual Property Management Co., Ltd., Osaka (JP)

(72) Inventors: Makoto Nagashima, Kyoto (JP); Youichirou Uka, Osaka (JP); Koji Okamoto, Kyoto (JP); Shigetaka Furusawa, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/726,632

(22) Filed: Jun. 1, 2015

(65) Prior Publication Data
US 2015/0262754 A1    Sep. 17, 2015

Related U.S. Application Data

(63) Continuation of application No. PCT/JP2013/006999, filed on Nov. 28, 2013.

(30) Foreign Application Priority Data

Dec. 7, 2012  (JP) .............................. 2012-267929

(51) Int. Cl.
*B05D 5/12* (2006.01)
*H01G 4/33* (2006.01)
(Continued)

(52) U.S. Cl.
CPC ............ *H01G 4/33* (2013.01); *H01G 9/0036* (2013.01); *H01G 9/028* (2013.01); *H01G 9/15* (2013.01)

(58) Field of Classification Search
USPC .......................... 427/79–81; 29/25.41–25.42
See application file for complete search history.

(56) References Cited

U.S. PATENT DOCUMENTS

| | | | |
|---|---|---|---|
| 4,009,424 A | * | 2/1977 | Itoh .......................... H01G 9/02 29/25.03 |
| 5,473,503 A | * | 12/1995 | Sakata ................... H01G 9/025 361/523 |

(Continued)

FOREIGN PATENT DOCUMENTS

| | | |
|---|---|---|
| JP | 2009-259930 | 11/2009 |
| JP | 2010-087401 | 4/2010 |

(Continued)

OTHER PUBLICATIONS

International Search Report of PCT application No. PCT/JP2013/006999 dated Feb. 18, 2014.

*Primary Examiner* — Brian K Talbot
(74) *Attorney, Agent, or Firm* — McDermott Will & Emery LLP

(57) ABSTRACT

A first conductive polymer solution in which fine particles of a conductive polymer are dispersed is applied to a dielectric layer of aluminum oxide, and this solution is dried to form a first conductive polymer layer. Next, a coating solution is applied to the first conductive polymer layer, this solution containing at least one selected from an aromatic sulfonic acid having, in one molecule of the acid, a carboxyl group and a hydroxyl group, or two carboxyl groups, and a salt of the aromatic sulfonic acid. The solution is then dried to form a coating layer. Next, a second conductive polymer solution is applied to the coating layer, the solution being a solution in which fine particles of a conductive polymer are dispersed. This solution is then dried to form a second conductive polymer layer. This process gives a solid electrolyte layer of a capacitor element.

15 Claims, 1 Drawing Sheet

(51) Int. Cl.
  *H01G 9/028* (2006.01)
  *H01G 9/00* (2006.01)
  *H01G 9/15* (2006.01)

(56) References Cited

U.S. PATENT DOCUMENTS

| | | | | |
|---|---|---|---|---|
| 5,586,001 | A * | 12/1996 | Amano | H01G 9/025 252/62.2 |
| 6,409,777 | B2 * | 6/2002 | Kobatake | H01G 9/00 29/25.01 |
| 7,988,743 | B2 * | 8/2011 | Shimamoto | H01G 9/028 29/25.03 |
| 8,058,135 | B2 * | 11/2011 | Merker | H01G 9/0032 257/E21.011 |
| 8,451,588 | B2 * | 5/2013 | Biler | H01G 9/0036 29/25.01 |
| 2003/0133256 | A1 * | 7/2003 | Yoshida | H01G 9/0036 361/523 |
| 2005/0219802 | A1 * | 10/2005 | Kobayashi | H01G 9/0032 361/523 |
| 2007/0047178 | A1 * | 3/2007 | Saitou | H01G 9/0032 361/523 |
| 2008/0247120 | A1 * | 10/2008 | Mori | H01G 9/0425 361/523 |
| 2009/0195966 | A1 * | 8/2009 | Ozawa | H01G 9/0425 361/523 |
| 2010/0024182 | A1 * | 2/2010 | Shimamoto | H01G 9/028 29/25.42 |
| 2010/0165546 | A1 | 7/2010 | Yoshida et al. | |
| 2011/0096466 | A1 * | 4/2011 | Horacek | H01G 9/0036 361/525 |
| 2011/0171366 | A1 | 7/2011 | Ning et al. | |
| 2012/0044615 | A1 * | 2/2012 | Takahashi | H01G 9/025 361/528 |
| 2012/0057275 | A1 | 3/2012 | Intelmann et al. | |
| 2012/0212880 | A1 * | 8/2012 | Ishimaru | H01G 9/048 361/530 |
| 2012/0320497 | A1 * | 12/2012 | Ehrenberg | H01G 11/56 361/525 |
| 2013/0177701 | A1 | 7/2013 | Ning et al. | |

FOREIGN PATENT DOCUMENTS

| | | |
|---|---|---|
| JP | 2012-043958 | 3/2012 |
| JP | 2012-517113 | 7/2012 |
| WO | 2007/097364 | 8/2007 |

* cited by examiner

METHOD FOR MANUFACTURING SOLID ELECTROLYTIC CAPACITOR

BACKGROUND

1. Technical Field

The present invention relates to a method for manufacturing a solid electrolytic capacitor having a solid electrolyte layer of a conductive polymer.

2. Background Art

With a rise in the speed of electronic instruments and the frequency therefor, capacitors low in ESR (Equivalent Series Resistance) and large in capacity have been strongly desired.

As such a capacitor, a solid electrolytic capacitor has been developed, in which a conductive polymer is used as a solid electrolyte of a capacitor element.

PTL 1 discloses a manufacturing method in which, at the time of forming a solid electrolyte layer of a conductive polymer: in order to form an inner layer of the solid electrolyte layer, a step of applying a conductive polymer solution and then drying the solution is repeated plural times; next, a solution obtained by mixing p-toluenesulfonic acid with 1,10-diaminodecane in ethanol is applied as a crosslinking agent, and then the solution is dried; and further a solution of a conductive polymer is used to form an outer layer of the solid electrolyte layer. The literature further discloses that the use of such a crosslinking agent makes it possible that an end of the resultant capacitor element is satisfactorily coated with the outer layer, without the outer layer being locally peeled away, to decrease initial ESR of this element.

CITATION LIST

Patent Literature

PTL 1: Japanese Translation of PCT Publication No. 2012-517113

SUMMARY

However, such a conventional solid electrolytic capacitor has a problem of being increased in ESR property in a high-temperature and high-humidity environment.

An object of the present invention is to provide a method for manufacturing a solid electrolytic capacitor excellent in humidity resistance and high in reliability.

In order to attain the object, the present invention is a method for manufacturing a solid electrolytic capacitor including a capacitor element having a dielectric layer and a solid electrolyte layer, the method including the following steps to be carried out sequentially: a first step of applying a first conductive polymer solution in which fine particles of a conductive polymer are dispersed, and drying the solution to form a first conductive polymer layer; a second step of applying, to the first conductive polymer layer, a coating solution containing at least one selected from an aromatic sulfonic acid having, in one molecule of the acid, a carboxyl group and a hydroxyl group, or two carboxyl groups, and salt of the aromatic sulfonic acid, and drying the coating solution; and a third step of applying, to a coating layer formed in the second step, a second conductive polymer solution in which fine particles of a conductive polymer are dispersed, and drying the solution to form a second conductive polymer layer.

As described above, according to the present invention, the resultant solid electrolytic capacitor is excellent in humidity resistance and high in reliability.

DETAILED DESCRIPTION OF PREFERRED EMBODIMENTS

A description will be made about a solid electrolytic capacitor of an exemplary embodiment of the present invention.

Figure 1:
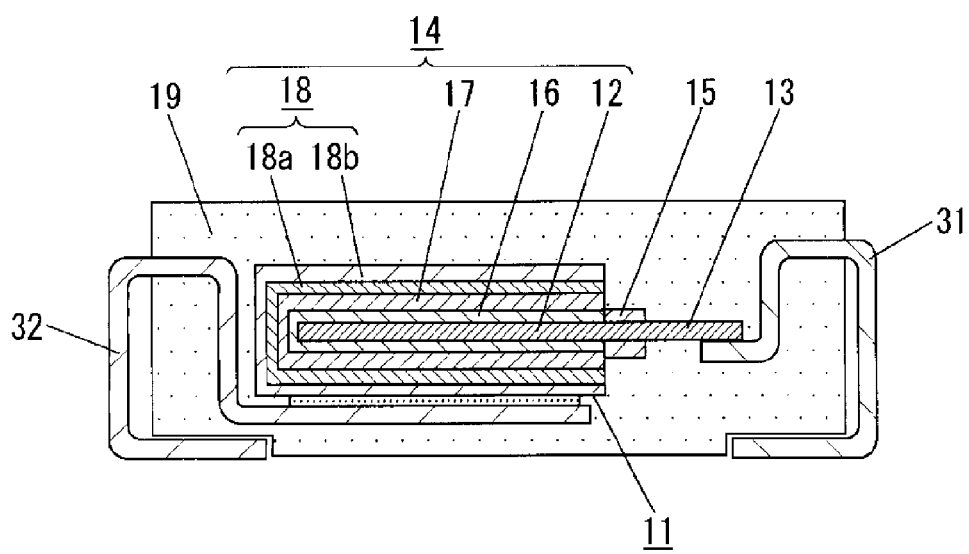
FIG. 1 is a schematic sectional view of a solid electrolytic capacitor in an exemplary embodiment of the present invention.
Figure 2:
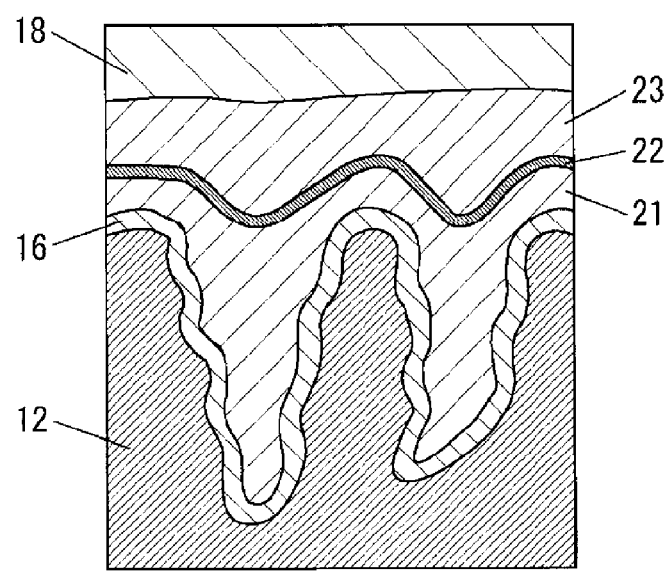
FIG. 2 is a schematic sectional view illustrating a main portion of a capacitor element in the exemplary embodiment of the present invention.

FIG. 1 is a schematic sectional view of the solid electrolytic capacitor in the exemplary embodiment of the present invention. FIG. 2 is a schematic sectional view illustrating a main portion of a capacitor element in the exemplary embodiment of the present invention.

As illustrated in FIG. 1, the solid electrolytic capacitor in the exemplary embodiment has capacitor element 11 having anode part 13 and cathode part 14; anode terminal 31 connected to anode part 13; cathode terminal 32 connected to cathode part 14; exterior resin part 19 with which respective partial portions of anode terminal 31 and cathode terminal 32, and capacitor element 11 are coated.

Cathode part 14 of capacitor element 11 is a part in which the following are sequentially laid onto each other: dielectric layer 16 formed on a surface of anode body 12; solid electrolyte layer 17 of a conductive polymer on a surface of dielectric layer 16; and cathode layer 18 of carbon layer 18a and conductive paste layer 18b.

Anode body 12 of cathode part 14 is a porous body in which a surface of a substrate is roughened, and is a body obtained by roughening a surface of an aluminum substrate, which is a valve action metal, by etching treatment. Alternatively, anode body 12 of cathode part 14 may be a body obtained by using a gas phase method such as vapor deposition to bond aluminum particles onto a surface of a substrate of a metal such as aluminum to roughen the surface.

Dielectric layer 16 has an aluminum oxide containing $Al_2O_3$ as a main component, and is a layer formed by anodizing anode body 12 chemically.

Anode part 13 of capacitor element 11 is located at a side of anode body 12 made of a valve action metal that is divided from cathode part 14 by insulating separating part 15.

The conductive polymer of solid electrolyte layer 17 may be polypyrrole, polythiophene or polyaniline, which is a π-conjugated conductive polymer, or a derivative of the polymer. This polymer is high in conductivity and excellent in ESR property. The conductive polymer is preferably poly(3,4-ethylenedioxythiophene), which is excellent in heat resistance.

As illustrated in FIG. 2, solid electrolyte layer 17 is a layer in which plural conductive polymer layers are laminated onto each other on the surface of dielectric layer 16. Solid electrolyte layer 17 has a layer in which first conductive polymer layer 21 and second conductive polymer layer 23 are sequentially laminated.

First conductive polymer layer 21 and second conductive polymer layer 23 are each a layer formed by applying a conductive polymer solution in which fine particles of a conductive polymer are dispersed, and drying the conductive polymer solution.

Furthermore, coating layer 22 is interposed between first conductive polymer layer 21 and second conductive polymer layer 23, and contacts first conductive polymer layer 21 and second conductive polymer layer 23.

Coating layer 22 may be formed in a discrete form on a surface of first conductive polymer layer 21. At this time, first conductive polymer layer 21 and second conductive polymer layer 23 partially contact each other directly. Coating layer 22 preferably coats 50% or more of the surface of first conductive polymer layer 21, and more preferably coats the whole of the surface of first conductive polymer layer 21.

At least two second conductive polymer layers 23 may be laminated onto each other, and coating layer 22 may be interposed between second conductive polymer layers 23.

Coating layer 22 contains at least one selected from an aromatic sulfonic acid having, in one molecule of the acid, a carboxyl group and a hydroxyl group, or two carboxyl groups, and a salt of the aromatic sulfonic acid. When coating layer 22 contains the aromatic sulfonic acid(s) or the salt(s), the resultant solid electrolytic capacitor can be restrained from being deteriorated in ESR property in a high-temperature and high-humidity environment, and is excellent in humidity resistance to be heightened in reliability.

About the aromatic sulfonic acid, its aromatic skeleton has at least one selected from the group consisting of benzene rings, naphthalene rings, and anthracene rings.

Coating layer 22 is a layer formed by applying a coating solution containing the aromatic sulfonic acid(s) or the salt(s) onto first conductive polymer layer 21, and then drying the coating solution.

The following will describe a method for forming the solid electrolyte layer in the exemplary embodiment of the present invention.

First, anode body 12 on which dielectric layer 16 is formed is immersed in a first conductive polymer solution, and the applied first conductive polymer solution is dried to remove the solvent partially or wholly. In this way, fine particles of the conductive polymer are caused to adhere onto anode body 12 with layer 16. The application and drying of the first conductive polymer solution are performed once, or are repeated plural times to form first conductive polymer layer 21 on a surface of dielectric layer 16 and in voids in the porous body of anode body 12.

Subsequently, anode body 12 over which first conductive polymer layer 21 is formed is immersed in a coating solution, and the applied coating solution is dried to remove the solvent partially or wholly. In this way, aromatic sulfonic acid(s) or aromatic sulfonic acid salt(s) are caused to adhere onto the surface of first conductive polymer layer 21. The application and drying of the coating solution are performed once, or are repeated plural times to form coating layer 22 on the surface of the first conductive polymer.

Next, anode body 12 over which coating layer 22 is formed is immersed in a second conductive polymer solution, and the applied second conductive polymer solution is dried to remove the solvent partially or wholly. In this way, fine particles of the conductive polymer are caused to adhere onto coating layer 22. The application and drying of the second conductive polymer solution are performed once, or are repeated plural times to form second conductive polymer layer 23 on coating layer 22. Due to the formation of second conductive polymer layer 23, solid electrolyte layer 17 having a desired thickness is formed on the outer surface of anode body 12.

It is also allowable to apply a coating solution further onto the second conductive polymer and dry the coating solution to form coating layer 22, and subsequently form second conductive polymer layer 23 on coating layer 22 by using a second conductive polymer solution, thus laminating coating layers 22 and second conductive polymer layers 23 alternately to form plural coating layers 22.

The aromatic sulfonic acid in the coating solution may be an aromatic sulfonic acid having, in one molecule of the acid, a carboxyl group and a hydroxyl group, such as sulfosalicylic acid or disulfosalicylic acid. The aromatic sulfonic acid may be an aromatic sulfonic acid having, in one molecule of the acid, two carboxyl groups, such as sulfophthalic acid, sulfoisophthalic acid, or sulfoterephthalic acid.

It is preferred that the coating solution contains therein the aromatic sulfonic acid(s) or the salt(s) thereof in an amount of 0.01 mol/L with respect to 1 mol/L of the coating solution. This solution is excellent in coating performance with the aromatic sulfonic acid(s) or the salt(s).

The coating solution has a pH measured at 25° C. preferably from 1 to 14, more preferably from 2 to 9.

A cation of the aromatic sulfonic acid salt in the coating solution is used to adjust the pH of the coating solution.

Examples of the aromatic sulfonic acid salt cation that is an inorganic cation include calcium, sodium, potassium, and ammonium ions.

The aromatic sulfonic acid salt cation that is an organic cation is an amine compound having an amino group such as a —$NH_2$ group, a —NH group or a —N group. One or more substituents each bonded to a nitrogen atom N of the amino group are each a linear or branched alky group, a benzene ring, or a naphthalene ring. A further amino group may be added to the substituent. The cation may have one or two amino groups. By the addition of the cationic amine compound, adhesiveness is improved between second conductive polymer layer 23 and the layer below layer 23, which is first conductive polymer layer 21 or a different second conductive polymer layer, with coating layer 22 interposed therebetween, so that second conductive polymer layer 23 is excellent in coating performance.

About the amine compound, the substituent bonded to the nitrogen atom N of the amino group is preferably an alkyl group. One of the substituents more preferably has a carbon number of 1 to 12. Examples of the amine compound having a —$NH_2$ group include butylamine, hexylamine, pentylamine, heptylamine, octylamine, nonylamine, decylamine, undecylamine, dodecylamine, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, aniline, phenylenediamine, and diaminonaphthalene; and derivatives of the compounds. Examples of the amine compound having a —NH group include dipropylamine, diisopropylamine, methylhexylamine, diisobutylamine, ethylhexylamine, diphenylamine, and N,N-dimethylethylenediamine; and derivatives of the compounds. Examples of the amine compound having a —N group include N,N-dimethylethylamine, N,N-dimethylpropylamine, N,N-dimethylbutylamine, N,N-dimethylpentylamine, N,N-dimethylhexylamine, N,N-dimethyheptylamine, N,N-dimethyoctylamine, N,N-dimethylnonylamine, N,N-dimethyldecylamine, N,N-dimethylundecylamine, N,N-dimethyldodecylamine, triethylamine, tripropylamine, tributylamine, and dimethylcyclohexylamine; and derivatives of the compounds.

The solvent may be water or an organic solvent, or a mixture of water and an organic solvent. Examples of the organic solvent include monohydric alcohols such as methanol, ethanol, and isopropyl alcohol; dihydric alcohols such as ethylene glycol and propylene glycol; trihydric alcohols such as glycerin; and dimethylsulfoxide, N,N-dimethylformamide, and tetrahydrofuran. The solvent preferably contains water as a main component.

The drying of the coating solution is performed preferably at a temperature of 50° C. to 250° C. to vaporize the solvent. In this case, solid electrolyte layer 17 is restrained from being deteriorated, and excellent workability is given.

The conductive polymer solution that is each of the first and second conductive polymer solutions is a solution obtained by subjecting a solution of a mixture of a monomer for a π-conjugated conductive polymer and a polyanionic acid, which is to be a dopant, to chemical oxidation polymerization with an oxidizer while the mixture solution is stirred, and thus dispersing fine particles of the resultant conductive polymer. The concentration of this solution, the diameter of the particles, the solvent, impurities and others are adjustable.

The fine particles of the conductive polymer are particles in which the π-conjugated conductive polymer is doped and bonded with the polyanion having anionic groups, or are made of aggregates of the particles.

The fine particles of the conductive polymer preferably have a particle diameter ranging from 5 nm to 500 nm both inclusive.

In order to impregnate voids in the porous body in anode body 12 with the first conductive polymer solution, the fine particles of the conductive polymer in this solution more preferably have a particle diameter of 100 nm or less.

In order to form the solid electrolyte layer having a large thickness on the outer surface of anode body 12, the fine particles of the conductive polymer in the second conductive polymer solution preferably have a particle diameter ranging from 100 nm to 500 nm both inclusive.

The average particle diameter of the fine particles of the conductive polymer can be calculated from a particle diameter distribution thereof that is measured by a dynamic light scattering method.

The viscosity of each of the first and second conductive polymer solutions is measured using a B-type viscometer, and is preferably from 10 mPa·s to 500 mPa·s. The viscosity of the second conductive polymer solution is preferably larger than that of the first conductive polymer solution. This case makes it possible to form solid electrolyte layer 17 having a large thickness on the outer surface of anode body 12.

The polyanionic acid preferably has, as its functional groups, sulfo groups. Examples of the acid include polystyrenesulfonic acid, polyethylenesulfonic acid, polyestersulfonic acid, phenolsulfonic acid novolak resin, polyacrylsulfonic acid, and polyvinylsulfonic acid.

The weight-average molecular weight of the polyanionic acid is adjusted in accordance with the dispersibility of the conductive polymer fine particles in the conductive polymer solution, and the conductivity of the solid electrolyte. Polystyrenesulfonic acid as the polyanionic acid preferably has a weight-average molecular weight of 50,000 to 500,000. Sulfonated polyester and phenolsulfonic acid novolak resin preferably each have a weight-average molecular weight of 5,000 to 80,000.

The content of the polyanion preferably ranges from 0.1 to 10 moles per mole of the conductive polymer.

The solvent may be water or an organic solvent, or a mixture of water and an organic solvent. The solvent preferably contains water as a main component. Examples of the organic solvent include monohydric alcohols such as methanol, ethanol, and propanol; and polyhydric alcohols such as ethylene glycol and glycerin. Examples of the solvent that is an aprotic polar solvent include N,N-dimethylformamide, dimethylsulfoxide, acetonitrile, acetone, and benzonitrile.

EXAMPLES

Hereinafter, working examples of the present invention will be described. The present invention is not limited to these working examples.

Example 1

(1) Preparation of First Conductive Polymer Solution

To an aqueous solution of a polystyrenesulfonic acid having a molecular weight of 5,000 to 20,000, 3,4-ethylenedioxythiophene as a monomer was added, and the resultant solution was stirred. Thereto were added oxidizers of iron(III) sulfate and sodium persulfate. When the resultant was stirred, the reactive components therein were chemically oxidization-polymerized. Next, an ion exchanger was used to filter the chemically oxidization-polymerized solution to remove irons ions, unreacted matters and others to produce a PEDOT-PSS solution. Furthermore, pure water was added to the PEDOT-PSS solution, and then a high-pressure homogenizer and a filter were used to adjust the particle diameter of the fine particles to yield a first conductive polymer solution.

The thus yielded fine particles of the conductive polymers poly(3,4-ethylenedioxythiophene) and polystyrenesulfone were dispersed in pure water in the form of a solution having a concentration of about 2% by weight to prepare a first conductive polymer solution of pH 3 to 5 in which the fine particles of the conductive polymers had an average particle diameter of 30 nm to 70 nm.

(2) Preparation of Second Conductive Polymer Solution

Pure water was added to the same PEDOT-PSS solution as used in the preparation of the first conductive polymer solution, and then a high-pressure homogenizer and a filter were used to adjust the particle diameter of the fine particles. In this way, a second conductive polymer solution was yielded.

The thus yielded fine particles of the conductive polymers poly(3,4-ethylenedioxythiophene) and polystyrenesulfone were dispersed in pure water in the form of a solution having a concentration of about 4% by weight to prepare a second conductive polymer solution of pH 3 to 5 in which the fine particles of the conductive polymers had an average particle diameter of 80 nm to 150 nm.

The first and second conductive polymer solutions did not contain any aromatic sulfonic acid contained in a coating solution in each working example described below.

(3) Preparation of Coating Solution

In pure water were dissolved 0.05 mol/L of sulfosalicylic acid and 0.1 mol/L of N,N-dimethyloctylamine to prepare a coating solution.

The coating solution did not contain fine particles of conductive polymers of poly(3,4-ethylenedioxythiophene) and polystyrenesulfone.

(4) Production of Solid Electrolytic Capacitor

As a substrate, an aluminum foil piece of 100 μm thickness was used, and a surface of the aluminum foil piece was etched. An insulating resist tape was bonded to the resultant anode body, and then separated to form a cathode-part-side anode body in a rectangular form.

Next, the anode body was immersed in an aqueous solution of ammonium dihydrogen phosphate that had a concentration of 0.3% by weight at a liquid temperature of 70° C. A DC voltage of 70 V was applied thereto for 20 minutes to form a dielectric layer of aluminum oxide.

Next, a first step was performed in which the anode body over which the dielectric layer was formed was immersed in the first conductive polymer solution, and then the solution was dried at 120° C. for 10 to 30 minutes. This first step was repeated twice to form a first conductive polymer layer.

Furthermore, a second step was performed in which the anode body over which the first conductive polymer layer was formed was immersed in the coating solution, and then the solution was dried at 120° C. for 10 to 30 minutes. In this way, a coating layer was formed.

Subsequently, a third step was performed in which the anode body over which the coating layer was formed was immersed in the second conductive polymer solution, and then the solution was dried at 120° C. for 10 to 30 minutes. In this way, a second conductive polymer layer was formed.

Furthermore, the second step and the third step were sequentially repeated. In this way, the second and third steps were repeated 3 times in total.

In this way, one of the coating layers was formed between the first conductive polymer layer and one of the second conductive polymer layers; and different one of the coating layers was formed between any two of the second conductive polymer layers.

Thereafter, the laminate was immersed in an aqueous carbon solution in which graphite was dispersed, and then dried at 130° C. to 180° C. for 10 to 30 minutes to form a carbon layer on the surface of the solid electrolyte layer. Furthermore, a conductive paste composed of an Ag filler and an epoxy binder resin was applied to the carbon layer, and then the paste was cured at a high temperature of 150° C. to 200° C. for 10 to 60 minutes to form a conductive paste layer.

As described above, the carbon layer and the conductive paste layer were sequentially formed on the surface of the solid electrolyte layer to produce a capacitor element.

Three such capacitor elements were laminated onto each other. About the laminated capacitor elements, their cathode layers were joined to a lead frame of cathode terminals with a conductive adhesive. About the laminated capacitor elements, the aluminum foil pieces of their anode parts were joined to a lead frame of anode terminals by laser welding.

Next, an epoxy resin with which silica fillers were mixed was used, and this resin was molded into a heat-resistant and insulating exterior resin part by transfer molding. Thus, a solid electrolytic capacitor was produced.

As will be described below, in each of Examples 2 and 3, a solid electrolytic capacitor was produced in the same way as in Example 1 except that the coating solution was changed to different one.

Example 2

As the coating solution in Example 2, prepared was a coating solution obtained by dissolving, in pure water, 0.05 mol/L of 4-sulfophthalic acid and 0.1 mol/L of 1,10-diaminodecane. This coating solution was used to produce a solid electrolytic capacitor.

Example 3

As the coating solution in Example 3, prepared was a coating solution obtained by dissolving, in pure water, 0.05 mol/L of 5-sulfoisophthalic acid and 0.1 mol/L of 1,10-diaminodecane. This coating solution was used to produce a solid electrolytic capacitor.

Comparative Example 1

In Comparative Example 1, a solid electrolytic capacitor was produced in the same way as in Example 1 except that the coating solution was changed to different one. In the comparative example, prepared was a coating solution obtained by dissolving, in pure water, 0.05 mol/L of p-toluenesulfonic acid and 0.1 mol/L of 1,10-diaminodecane. This coating solution was used to produce a solid electrolytic capacitor.

Comparative Example 2

In Comparative Example 2, a solid electrolytic capacitor was produced in the same way as in Example 1 except that the coating solution was changed to different one. In the comparative example, prepared was a coating solution obtained by dissolving, in pure water, 0.05 mol/L of phenolsulfonic acid and 0.1 mol/L of 1,10-diaminodecane. This coating solution was used to produce a solid electrolytic capacitor.

Next, concerning the solid electrolytic capacitors of Examples 1 to 3 and Comparative Examples 1 and 2, test results are shown (in Table 1) about a high-temperature non-load test and a high-temperature and high-humidity load test of these examples.

In the high-temperature non-load test, 30 samples were used for each of the working examples and the comparative examples. The samples were allowed to stand still in an atmosphere of 105° C. temperature for 1000 hours. After the 1000 hours, the samples were measured about the ESR property thereof. An average value was calculated from the resultant values.

In the high-temperature and high-humidity load test, 30 samples were used for each of the working examples and the comparative examples. A voltage of 16 V was applied to the samples in an atmosphere of 85° C. temperature and 85% RH for 1000 hours. After the 1000 hours, the samples were measured about the ESR property thereof. An average value was calculated from the resultant values.

About an initial value of each of the samples in each of the high-temperature non-load test and the high-temperature and high-humidity load test, an initial ESR property was measured. An average value was calculated from the resultant values. The ESR property was measured at a frequency of 100 kH.

TABLE 1

| Classification | Coating Solution | | High-temperature Initial ESR (mΩ) | High-temperature non-load test ESR (mΩ) | High-temperature and high-humidity load test ESR (mΩ) |
|---|---|---|---|---|---|
| | Aromatic sulfonic acid | Cation | | | |
| Example 1 | Sulfosalicylic acid | N,N-dimethyloctylamine | 25 | 31 | 34 |
| Example 2 | 4-Sulfophthalic acid | 1,10-Diaminodecane | 25 | 32 | 31 |
| Example 3 | 5-Sulfoisophthalic acid | 1,10-Diaminodecane | 25 | 31 | 32 |
| Comparative Example 1 | p-Toluenesulfonic acid | 1,10-Diaminodecane | 26 | 32 | 150 |
| Comparative Example 2 | Phenolsulfonic acid | 1,10-Diaminodecane | 26 | 33 | 200 |

As shown in "Table 1," according to a comparison between the solid electrolytic capacitors of Examples 1 to 3 formed using the coating solutions containing sulfosalicylic acid, 4-sulfophthalic acid, and 5-sulfoisophthalic acid, respectively, and those of Comparative Examples 1 and 2 in the case of using the coating solutions containing p-toluenesulfonic acid and phenolsulfonic acid, respectively, the former is substantially equal to the latter in ESR property in the high-temperature non-load test. However, in the former, deterioration in the ESR property in the high-temperature and high-humidity load test is remarkably overcome. Thus, it is understood that the resultant solid electrolytic capacitors are excellent in humidity resistance and high in reliability.

In Examples 1 to 3, their solid electrolyte layer had a thickness equivalent to that of Comparative Example 1. The solid electrolyte layer is excellent in coating performance.

INDUSTRIAL APPLICABILITY

The method of the present invention for manufacturing a solid electrolytic capacitor has an advantageous effect of being excellent in humidity resistance, and is useful for electrolytic capacitors each having a solid electrolyte layer of a conductive polymer.

REFERENCE MARKS IN THE DRAWINGS 11 capacitor element
12 anode body
13 anode part
14 cathode part
15 separating part
16 dielectric layer
17 solid electrolyte layer
18 cathode layer
19 exterior resin part
21 first conductive polymer layer
22 coating layer
23 second conductive polymer layer
31 anode terminal
32 cathode terminal

What is claimed is:

1. A method for manufacturing a solid electrolytic capacitor comprising a capacitor element having an anode body, a dielectric layer and a solid electrolyte layer, the method comprising the following steps to be carried out in this order for forming the solid electrolyte layer:
a first step of applying a first conductive polymer solution in which fine particles of a conductive polymer are dispersed, and drying the first conductive polymer solution, to form a first conductive polymer layer;
a second step of applying a coating solution containing at least one selected from an aromatic sulfonic acid and a salt of the aromatic sulfonic acid, and drying the coating solution; and
a third step of applying a second conductive polymer solution in which fine particles of a conductive polymer are dispersed, and drying the second conductive polymer solution, to form a second conductive polymer layer, wherein:
the aromatic sulfonic acid has, in one molecule of the aromatic sulfonic acid, a carboxyl group and a hydroxyl group, or two carboxyl groups, and
the coating solution contains neither a conductive polymer nor a monomer to be polymerized into a conductive polymer.

2. The method for manufacturing a solid electrolytic capacitor according to claim 1, wherein the aromatic sulfonic acid is sulfosalicylic acid, sulfophthalic acid, or sulfoisophthalic acid.

3. The method for manufacturing a solid electrolytic capacitor according to claim 1, wherein the coating solution further contains a cation of an amine compound having a —NH$_2$ group, —NH group, or —N group.

4. The method for manufacturing a solid electrolytic capacitor according to claim 3, wherein the cation of the amine compound includes one or more substituents of alkyl group, each one of the substituents is bonded to the nitrogen atom N, and has a carbon number of 1 to 12.

5. The method for manufacturing a solid electrolytic capacitor according to claim 1, wherein the first conductive polymer solution includes none of the aromatic sulfonic acid contained in the coating solution.

6. The method for manufacturing a solid electrolytic capacitor according to claim 3, wherein the amine compound is alkylenediamine.

7. The method for manufacturing a solid electrolytic capacitor according to claim 3, wherein the amine compound is N,N-dimethyloctylamine or 1,10-diaminodecane.

8. The method for manufacturing a solid electrolytic capacitor according to claim 1, wherein the coating solution contains an anion of sulfosalicylic acid, sulfophthalic acid, or sulfoisophthalic acid and a cation of N,N-dimethyloctylamine or 1,10-diaminodecane.

9. The method for manufacturing a solid electrolytic capacitor according to claim 1, wherein the coating solution contains none of a conductive polymer, a monomer to be polymerized into a conductive polymer and a conductive carbon.

10. The method for manufacturing a solid electrolytic capacitor according to claim 9, wherein the aromatic sulfonic acid is sulfosalicylic acid, sulfophthalic acid, or sulfoisophthalic acid.

11. The method for manufacturing a solid electrolytic capacitor according to claim 9, wherein the coating solution contains none of a conductive polymer, a monomer to be polymerized into a conductive polymer, a conductive carbon and any other conductive material particles.

12. A method for manufacturing a solid electrolytic capacitor comprising a capacitor element having an anode body, a dielectric layer and a solid electrolyte layer, the method comprising the following steps to be carried out in this order for forming the solid electrolyte layer:

a first step of applying a first conductive polymer solution in which fine particles of a conductive polymer are dispersed, and drying the first conductive polymer solution, to form a first conductive polymer layer;

a second step of applying a coating solution containing an anion of an aromatic sulfonic acid having a carboxyl group, and drying the coating solution; and a third step of applying a second conductive polymer solution in which fine particles of a conductive polymer are dispersed, and drying the second conductive polymer solution, to form a second conductive polymer layer, wherein the coating solution contains neither a conductive polymer nor a monomer to be polymerized into a conductive polymer.

13. The method for manufacturing a solid electrolytic capacitor according to claim 12, wherein the first conductive polymer solution includes none of the anion of the aromatic sulfonic acid contained in the coating solution.

14. The method for manufacturing a solid electrolytic capacitor according to claim 12, wherein the coating solution contains none of a conductive polymer, a monomer to be polymerized into a conductive polymer and a conductive carbon.

15. The method for manufacturing a solid electrolytic capacitor according to claim 14, wherein the coating solution contains none of a conductive polymer, a monomer to be polymerized into a conductive polymer, a conductive carbon and any other conductive material particles.

* * * * *